US011794293B2

(12) United States Patent
Baaj

(10) Patent No.: US 11,794,293 B2
(45) Date of Patent: Oct. 24, 2023

(54) AUTOMATED MODULAR CONSTRUCTION FACTORY METHOD AND SYSTEM

(71) Applicant: Mohamad Yasser Baaj, Dubai (AE)

(72) Inventor: Mohamad Yasser Baaj, Dubai (AE)

( * ) Notice: Subject to any disclaimer, the term of this patent is extended or adjusted under 35 U.S.C. 154(b) by 0 days.

(21) Appl. No.: 17/735,928

(22) Filed: May 3, 2022

(65) Prior Publication Data

US 2022/0347804 A1 Nov. 3, 2022

Related U.S. Application Data

(60) Provisional application No. 63/183,547, filed on May 3, 2021.

(51) Int. Cl.
| | | |
|---|---|---|
| *B23P 19/04* | (2006.01) | |
| *B23P 21/00* | (2006.01) | |
| *E04B 1/348* | (2006.01) | |
| *E04B 1/02* | (2006.01) | |
| *E04C 2/04* | (2006.01) | |

(52) U.S. Cl.
CPC ............. *B23P 19/04* (2013.01); *B23P 21/004* (2013.01); *E04B 1/02* (2013.01); *E04B 1/34823* (2013.01); *E04C 2/044* (2013.01)

(58) Field of Classification Search
CPC ......... Y10T 29/49623; Y10T 29/49629; B23P 19/04; B23P 21/004; E04B 1/02; E04B 1/04; E04B 1/34823; E04C 2/044; E04C 2/46; E04C 2/50; E04H 1/005
See application file for complete search history.

(56) References Cited

U.S. PATENT DOCUMENTS

| | | |
|---|---|---|
| 8,001,730 B2 | 8/2011 | Wallance |
| 8,621,818 B1 | 1/2014 | Glenn |
| 2006/0075718 A1 | 4/2006 | Borne |
| 2007/0260345 A1* | 11/2007 | Mifsud .................. B23P 19/04 700/165 |

(Continued)

FOREIGN PATENT DOCUMENTS

| | | |
|---|---|---|
| CN | 110424531 A | 11/2019 |
| DE | 3537754 A1 | 4/1987 |

(Continued)

OTHER PUBLICATIONS

Use Prefabricated Wall Panels, Retrieved from HGTV, Retrieved on Jan. 14, 2021 <URL: https://www.hgtv.com/design/remodel/mechanical-systems/use-prefabricated-wall-panels>.

*Primary Examiner* — Matthew P Travers

(57) ABSTRACT

A method and system for an automated modular construction factory is presented. A plurality of pre-cast construction panels, a quality control zone, a transportation system, a general stockyard, a sequencing system, an assembly zone, an assembly system, a transit system, a finishing zone, and a plurality of finishing stations are provided. The pre-cast construction panels undergo quality control under the quality control zone and are transported and ordered to the general stockyard through the transportation and sequencing systems. The panels are then assembled into a constructed room in the assembly zone through the assembly system. The constructed room is transported by the transit system to the finishing zone where the constructed room is furnished and completed by the plurality of finishing stations.

10 Claims, 12 Drawing Sheets

(56) References Cited

U.S. PATENT DOCUMENTS

2008/0086978 A1\* 4/2008 Gilgan ................ E04B 1/34336
52/749.1

FOREIGN PATENT DOCUMENTS

| RU | 2032047 C1 | 3/1995 |
| WO | WO2008027234 A2 | 3/2008 |
| WO | 2016120908 A1 | 8/2016 |

\* cited by examiner

AUTOMATED MODULAR CONSTRUCTION FACTORY METHOD AND SYSTEM

FIELD OF THE INVENTION

The present invention relates generally to a construction method and system. More specifically, the present invention provides an automated modular construction factory method and system that manufacture structurally complete and fully finished building modules (rooms) and dispatch them to the site.

BACKGROUND OF THE INVENTION

The construction industry consumes 30% of the world's workforce resources, 40% of the global energy, and has a share up to 40% of the global gas emission. These numbers come from the fact that the majority of construction work is done at the site using intensively craft skilled labors-based methodologies. While other industries moved to automated manufacturing processes, the construction industry lacks this ability so far. Modular construction is workforce dependent and the main difference between the construction on-site is that the activities are conducted in the factory. Although modular construction reduces manpower use, it is still manually operated. The process in general starts with room assembly and goes further through the finishing sectors of the production to get the module ready for shipment at the end of the production line. the major labor cost to activity ratio (value-based) lies in the first phase of production that is "room (or module) assembly" which takes around 40% of the total workforce per room for a value that does not exceed 20 to 22% of the total module value. This labor-intensive production, in addition to production overhead and logistic costs, keeps modular construction struggling to compete with conventional construction or other off-site-based construction methodologies and the cure to this issue is "automation" in order to cut the labor cost.

An objective of the present invention is to reduce the dependency on manpower needed for modular production. Another objective of the present invention is to enhance the quality of the end-product by implementing automation in the majority of production activities. Another objective of the present invention is to expedite the assembly activities in the production facility. Another objective of the present invention is to boost the productivity of the overall facility. Another objective of the present invention is to reduce the production overhead per unit of production due to the higher productivity and lesser rework. Consequently, this results in more competitiveness of the system. Additional features and benefits are further discussed in the sections below.

SUMMARY OF THE INVENTION

The present invention is a method and system for a modular construction factory. A plurality of pre-cast construction panels, a quality control zone, a transportation system, a general stockyard, a sequencing system, a sequencing zone, an assembly zone, an assembly system, a transit system, a finishing zone, and a plurality of finishing stations are provided. The plurality of pre-cast construction panels is transported from a supply source to the quality control station through a panel conveyor system. Each of the plurality of pre-cast construction panels is inspected through the quality control station, where the quality control station is configured to process the plurality of pre-cast construction panels into quality control (QC) passed plurality of pre-cast construction panels. The QC passed plurality of pre-cast construction panels is transported from the quality control station to the general stockyard through the transportation system. The QC passed plurality of pre-cast construction panels is sequenced into a plurality of building materials in the sequencing zone using the sequencing system. The plurality of building materials is transported from the sequencing zone to the assembly zone using the transportation system. The plurality of building materials received from the sequencing zone using the assembly system to form a constructed building module. The constructed building module is transported from the assembly zone to the finishing zone using the transit system. The constructed building module is finished using the plurality of finishing stations to form a modular building construct. In the preferred embodiment, the method and system for a modular construction factory autonomously fabricates the plurality of pre-cast construction panels into a modular building construct. Using a plurality of purpose-built fabrication machines, scanners, electrical carriages, or any other suitable automated device, the present invention is able to reduce the dependency on manpower needed for modular production. Additionally, the quality of the end product is enhanced by implementing automation in the majority of the production activities.

Furthermore, the method expedites and boosts the productivity of the overall facility.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
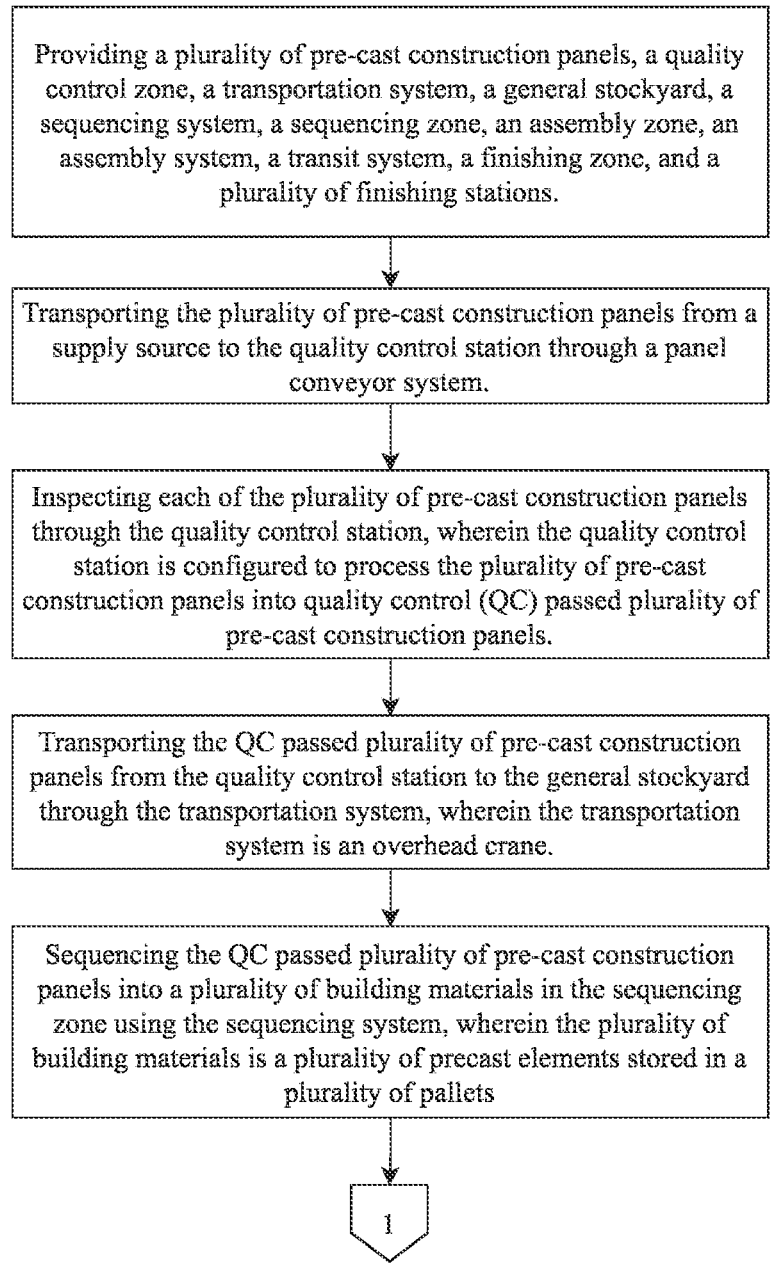
FIG. 1 is a flow chart illustrating the process of the present invention.
Figure 2:
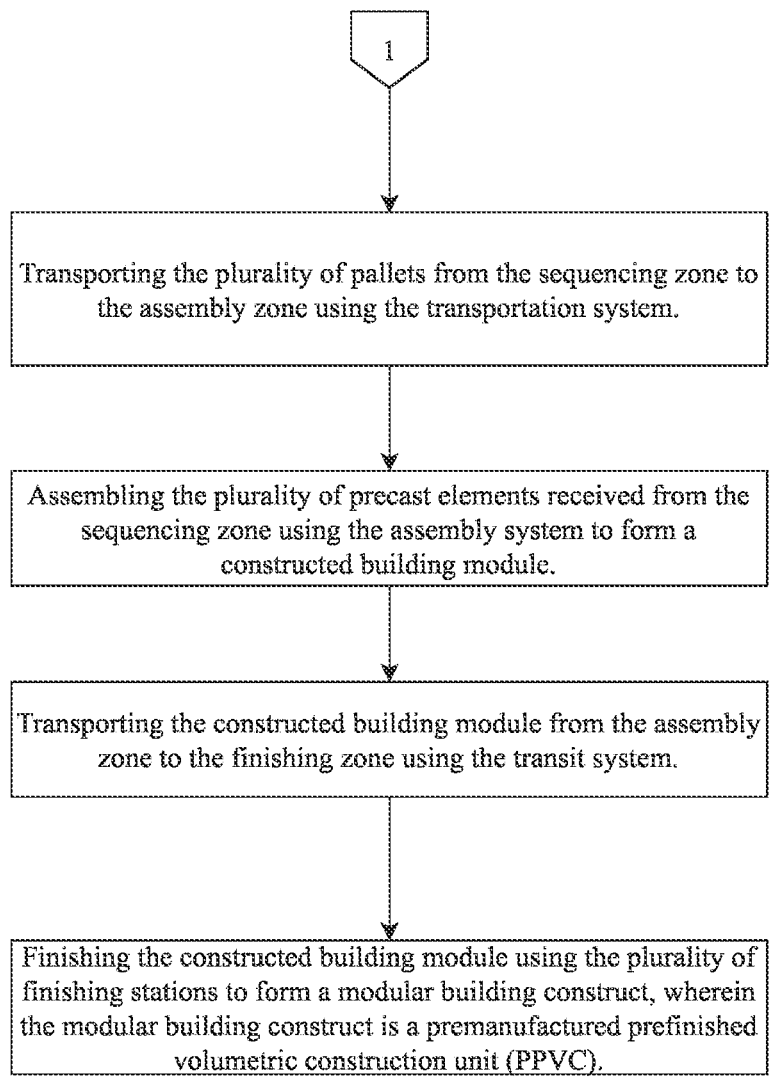
FIG. 2 is a flow chart diagram continuing from the flow chart shown in FIG. 1.

In reference to FIGS. 1-2, the present invention is a method and system for a modular construction factory. A plurality of pre-cast construction panels, a quality control zone, a transportation system, a general stockyard, a sequencing system, a sequencing zone, an assembly zone, an assembly system, a transit system, a finishing zone, and a plurality of finishing stations are provided. The plurality of pre-cast construction panels is transported from a supply source to the quality control station through a panel conveyor system. Each of the plurality of pre-cast construction panels is inspected through the quality control station, where the quality control station is configured to process the plurality of pre-cast construction panels into quality control (QC) passed plurality of pre-cast construction panels. The QC passed plurality of pre-cast construction panels is transported from the quality control station to the general stockyard through the transportation system. The QC passed plurality of pre-cast construction panels is sequenced into a plurality of building materials in the sequencing zone using the sequencing system. The plurality of building materials is transported from the sequencing zone to the assembly zone using the transportation system. The plurality of building materials received is assembled from the sequencing zone using the assembly system to form a constructed building module. The constructed building module is transported from the assembly zone to the finishing zone using the transit system. The constructed building module is finished using the plurality of finishing stations to form a modular building construct. In the preferred embodiment, the method and system for a modular construction factory autonomously fabricates the plurality of pre-cast construction panels into a modular building construct. Using a plurality of purpose-built fabrication machines, scanners, electrical carriages, or any other suitable automated device, the present invention is able to reduce the dependency on manpower needed for modular production. Additionally, the quality of the end product is enhanced by implementing automation in the majority of the production activities. Furthermore, the method expedites and boosts the productivity of the overall facility.

Figure 3:
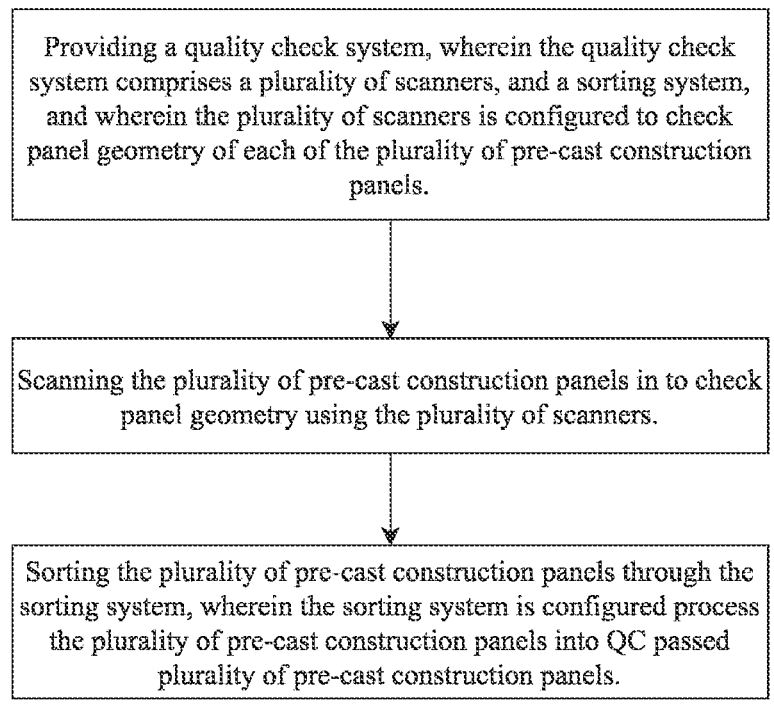
FIG. 3 is a flow chart illustrating a quality check system used in the present invention.
Figure 4:
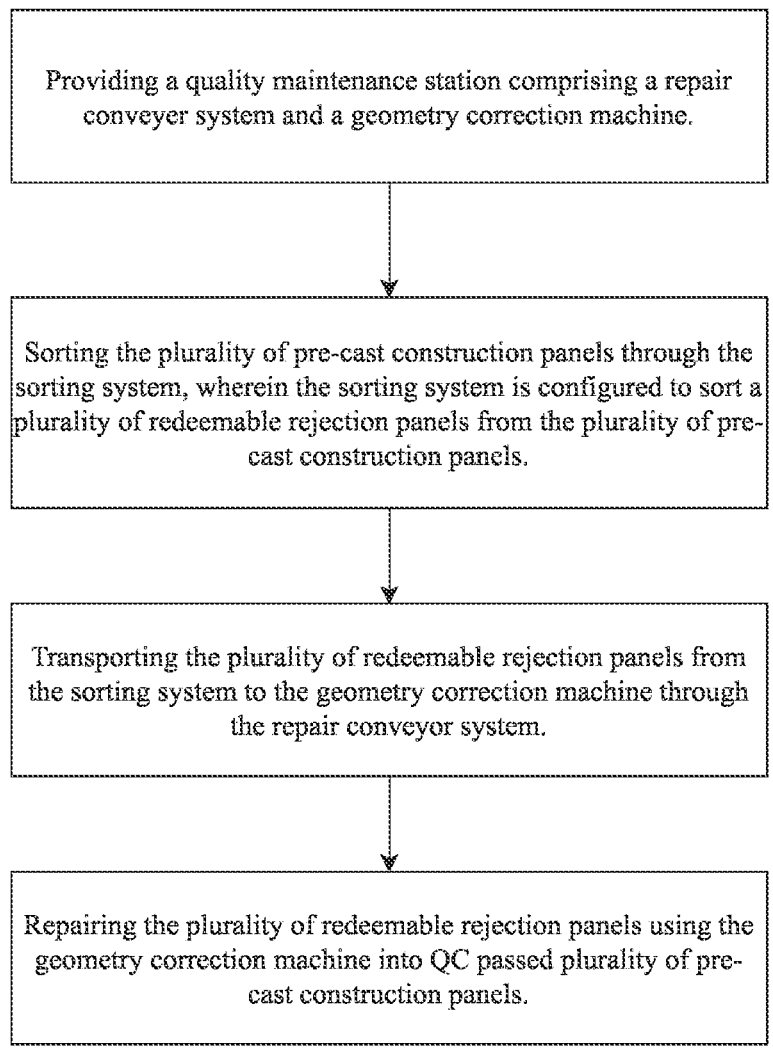
FIG. 4 is a flow chart illustrating a quality maintenance station used in the present invention.
Figure 5:
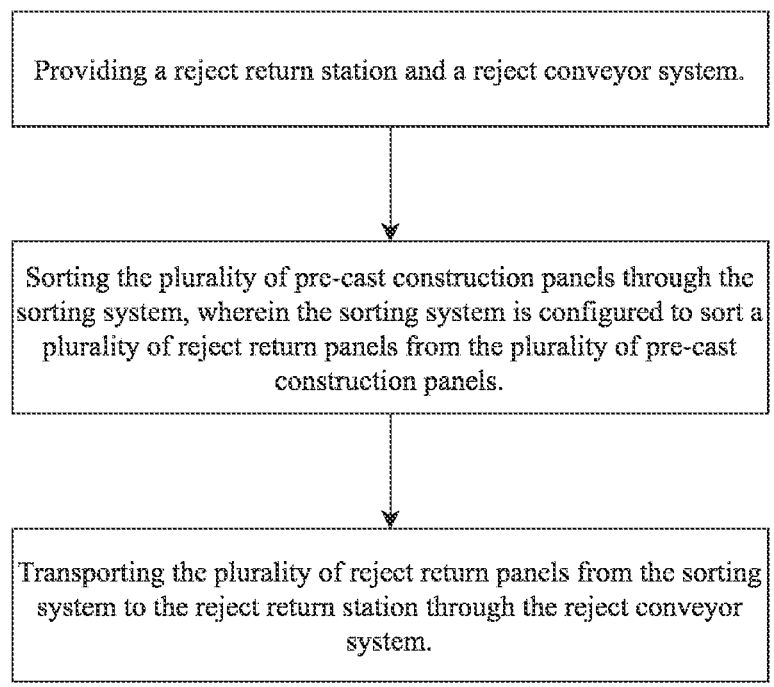
FIG. 5 is a block diagram illustrating a reject return station used in the present invention.

In reference to FIGS. 3-5, a quality check system, where the quality check system comprises a plurality of scanners, and a sorting system, and where the plurality of scanners is configured to check panel geometry of each of the plurality of pre-cast construction panels are provided. The plurality of pre-cast construction panels is scanned in to check panel geometry using the plurality of scanners. The plurality of pre-cast construction panels is sorted through the sorting system, where the sorting system is configured process the plurality of pre-cast construction panels into QC passed plurality of pre-cast construction panels. A quality maintenance station comprises a repair conveyer system and a geometry correction machine are provided. The plurality of pre-cast construction panels is sorted through the sorting system, where the sorting system is configured to sort a plurality of redeemable rejection panels from the plurality of pre-cast construction panels. The plurality of redeemable rejection panels is transported from the sorting system to the geometry correction machine through the repair conveyor system. The plurality of redeemable rejection panels is repaired using the geometry correction machine into QC passed plurality of pre-cast construction panels. A reject return station and a reject conveyor system are provided. The plurality of pre-cast construction panels is sorted through the sorting system, where the sorting system is configured to sort a plurality of reject return panels from the plurality of pre-cast construction panels. The plurality of reject return panels is transported from the sorting system to the reject return station through the reject conveyor system.

Figure 6:
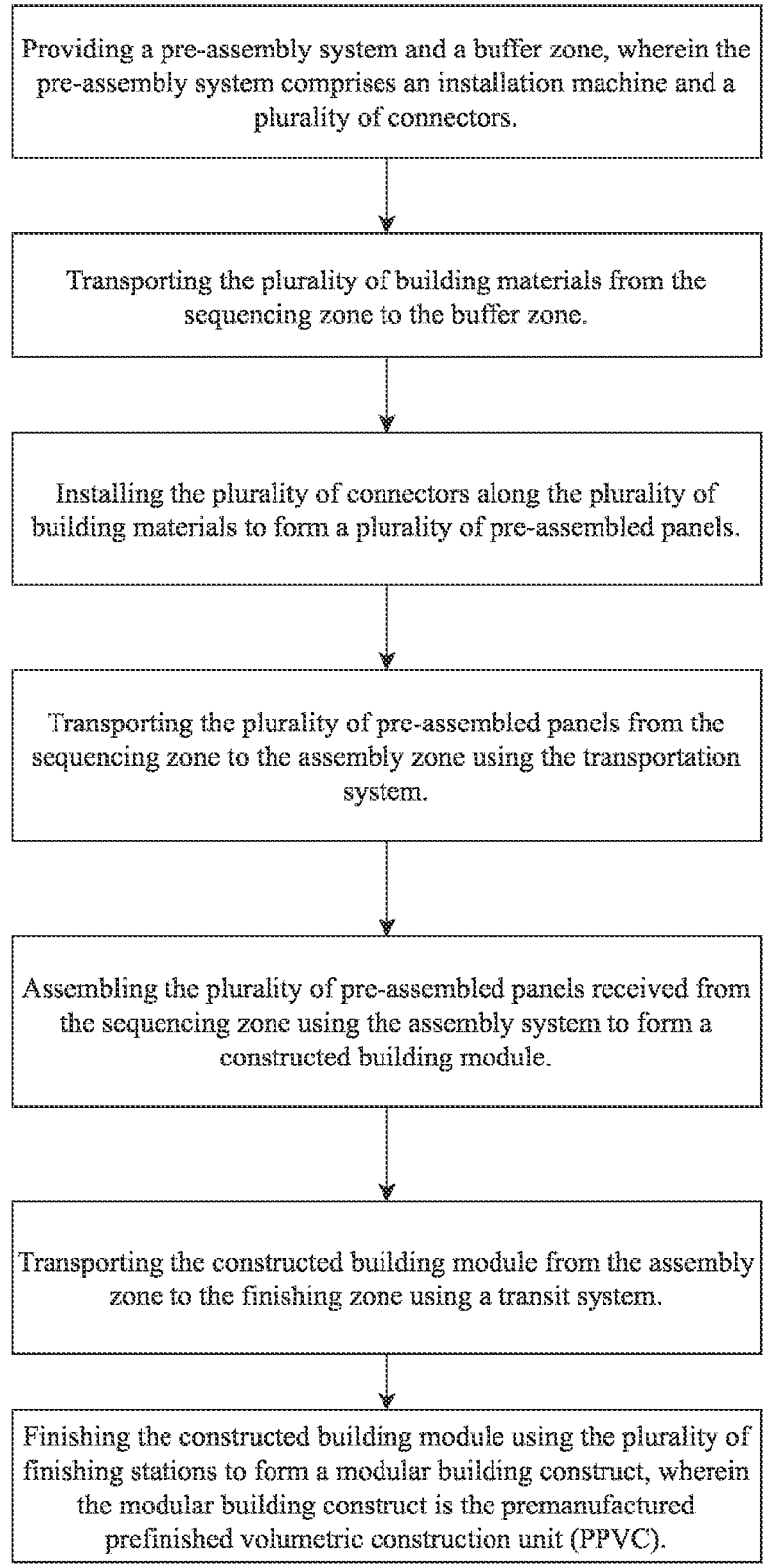
FIG. 6 is a diagram illustrating a pre-assembly system used in the present invention.

In reference to FIG. 6, a pre-assembly system and a buffer zone, where the pre-assembly system comprises an installation machine and a plurality of connector, are provided. The plurality of building materials is transported from the sequencing zone to the buffer zone. The plurality of connectors along the plurality of building materials is installed to form a plurality of pre-assembled panels. The plurality of pre-assembled panels is transported from the sequencing zone to the assembly zone using the transportation system. The plurality of pre-assembled panels received from the sequencing zone is assembled using the assembly system to form a constructed building module. The constructed building module is transported from the assembly zone to the finishing zone using a transit system. The constructed building module is finished using the plurality of finishing stations to form a modular building construct.

Figure 7:
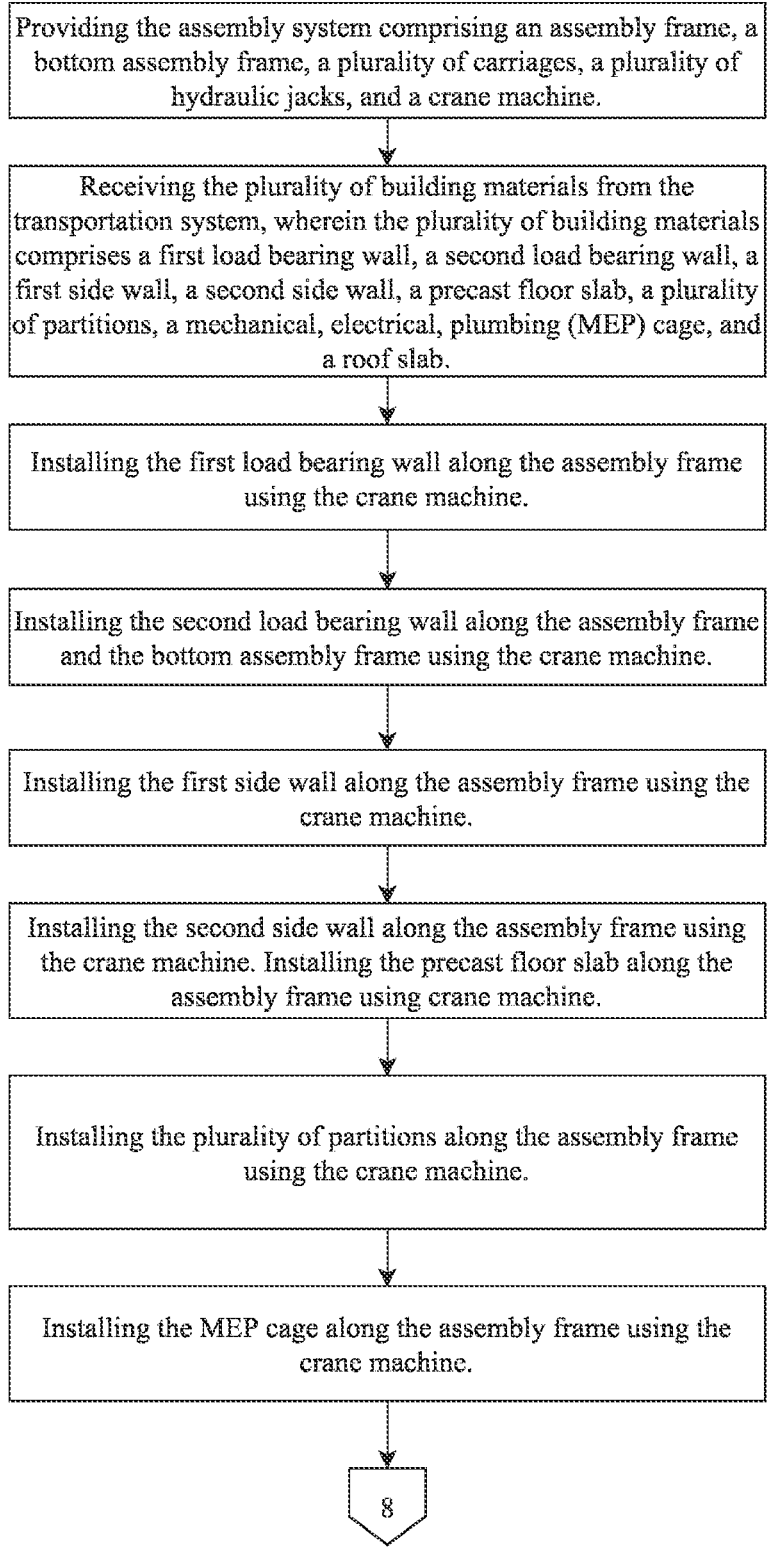
FIG. 7 is a diagram illustrating an assembly system used in the present invention.
Figure 8:
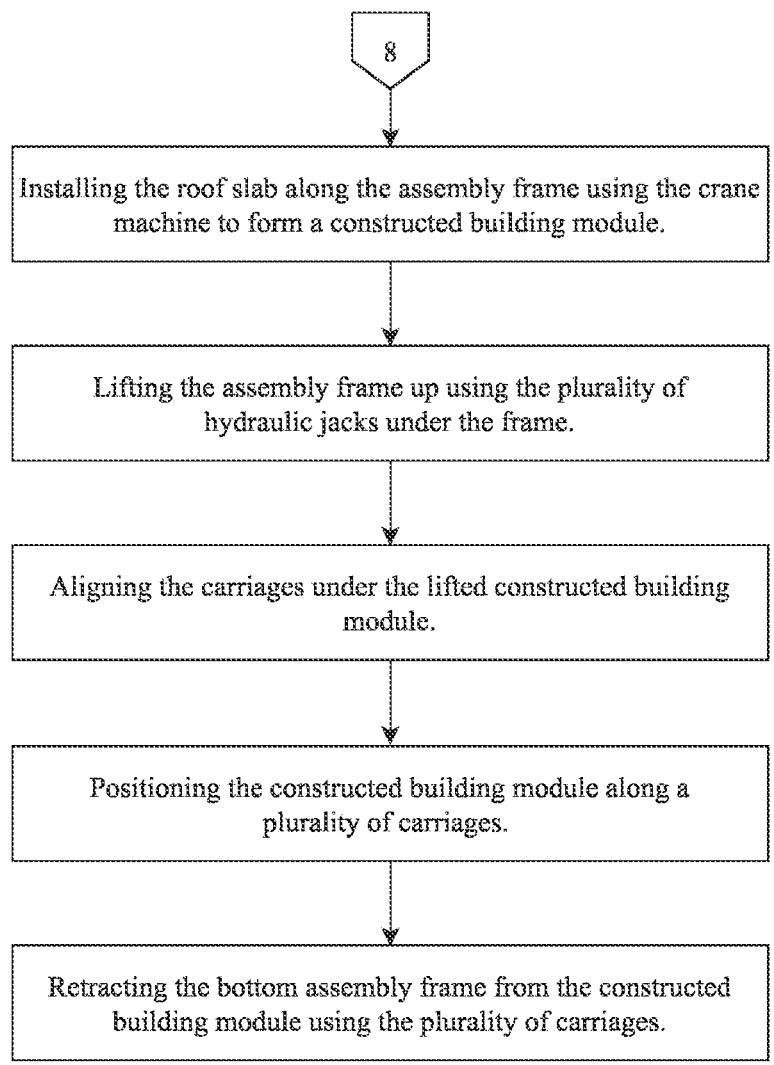
FIG. 8 is a flowchart diagram continuing from the flowchart shown in FIG. 7.

In reference to FIGS. 7-8, the assembly system comprising an assembly frame, a bottom assembly frame, a plurality of carriages, a plurality of hydraulic jacks, and a crane machine. is provided. The plurality of building materials is received from the transportation system, where the plurality of building materials comprises a first load bearing wall, a second load bearing wall, a first side wall, a second side wall, a floor slab, a plurality of partitions, a MEP (mechanical, electrical, plumbing) cage, and a roof slab. The first load bearing wall is installed along the assembly frame using the crane machine. The second load bearing wall is installed along the assembly frame using the crane machine. The first side wall along is installed the assembly frame using the crane machine. The second side wall is installed along the assembly frame using the crane machine. The plurality of partitions is installed along the assembly frame using the crane machine. The MEP cage is installed along the assembly frame using the crane machine. The roof slab is installed along the assembly frame using the crane machine to form a constructed building module. The assembly frame is lifted up using the plurality of hydraulic jacks under the frame. The plurality of carriages is aligned under the lifted constructed building module. The assembly frame is retracted from the constructed building module using the crane machine. The constructed building module is positioned along a plurality of carriages. The bottom assembly frame is retracted from the constructed building module using the plurality of carriages.

Figure 9:
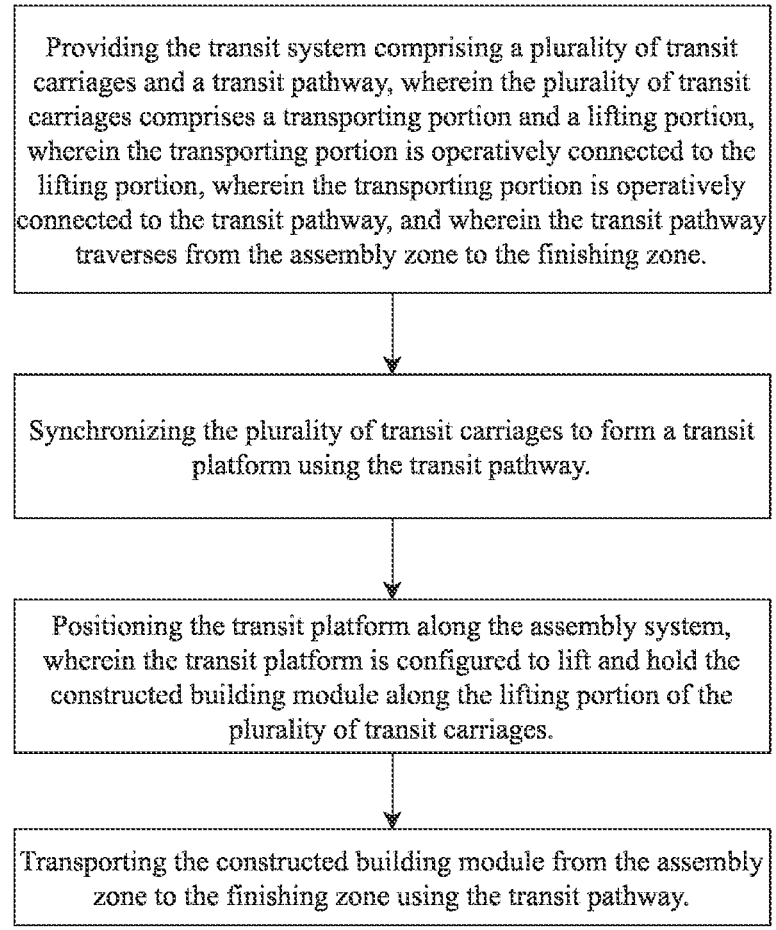
FIG. 9 is a diagram illustrating a transit system used in the present invention.
Figure 10:
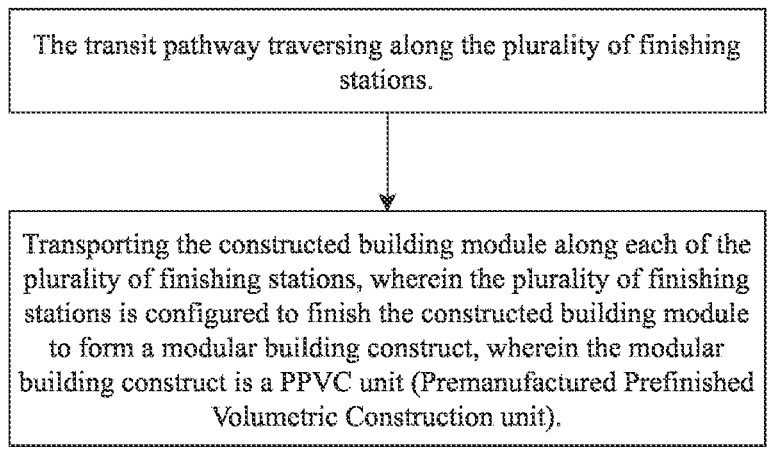
FIG. 10 is a diagram illustrating the transit system used in the present invention.

In reference to FIGS. 9-10, the transit system comprises a plurality of transit carriages and a transit pathway, where the plurality of transit carriages comprises a transporting portion and a lifting portion, where the transporting portion is operatively connected to the lifting portion, where the transporting portion is operatively connected to the transit pathway, and where the transit pathway traverses from the assembly zone to the finishing zone, is provided. The plurality of transit carriages is synchronized to form a transit platform using the transit pathway The transit platform is positioned along the assembly system, where the transit platform is configured to lift and hold the constructed building module along the lifting portion of the plurality of transit carriages. The constructed building module is transported from the assembly zone to the finishing zone using the transit pathway. The transit pathway traverses along the plurality of finishing stations. The constructed building module is transported along each of the plurality of finishing stations, where the plurality of finishing stations is configured to finish the constructed building module to form a modular building construct.

Figure 11:
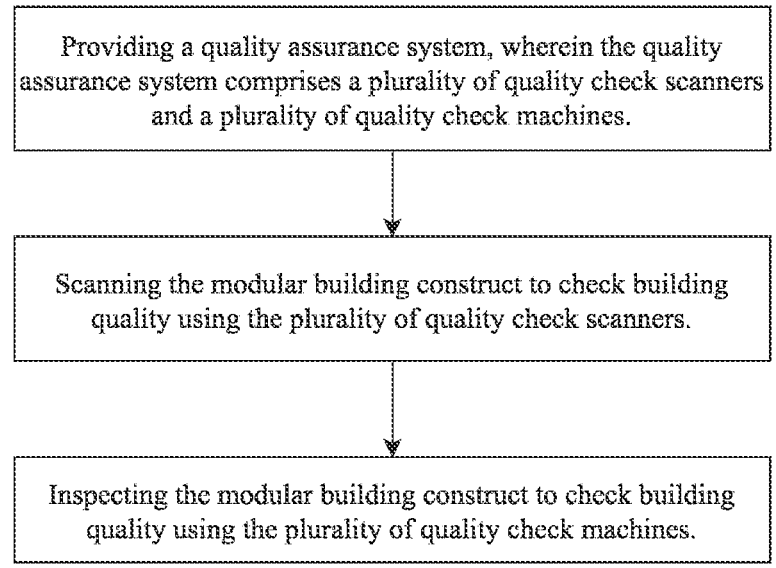
FIG. 11 is a diagram illustrating a quality assurance system used in the present invention.
Figure 12:
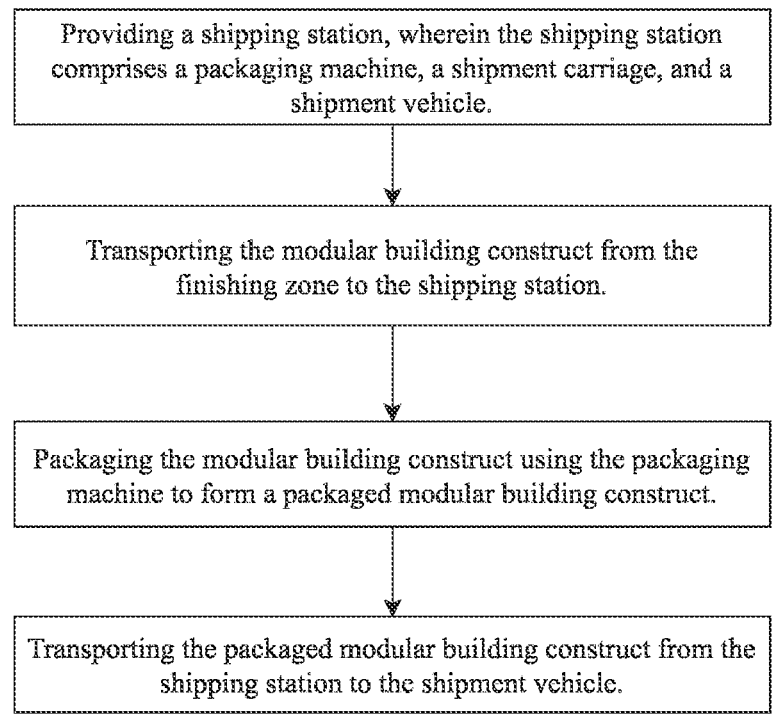
FIG. 12 is a diagram illustrating a shipping station used in the present invention.

In reference to FIG. 11, a quality assurance system, where the quality assurance system comprises a plurality of quality check scanners and a plurality of quality check machines, is provided. The modular building construct is scanned to check building quality using the plurality of quality check scanners. The modular building construct is inspected to check building quality using the plurality of quality check machines. In reference to FIG. 12, a shipping station, where the shipping station comprises a packaging machine, a shipment carriage, and a shipment vehicle, is provided. The modular building construct is transported from the finishing zone to the shipping station. The modular building construct is packaged using the packaging machine to form a packaged modular building construct. The packaged modular building construct is transported from the shipping station to the shipment vehicle.

In the preferred embodiment, the plurality of pre-cast construction panels takes the form of any type of construction material suitable for pre-fabricated modular construction. In the preferred embodiment, the quality control zone serves as the main site where the plurality pre-cast construction panels are inspected. In the preferred embodiment, the quality control zone comprises a panel quality assessment station composed of twelve chambers where each of the chambers is provided with automatic laser scanners, where the automatic laser scanners are based on light detection and ranging (LIDAR) technology. The scanner checks the geometry of each of the pre-cast construction panels of quality characteristics including, but not limited to overall dimensional accuracy, panel squareness, panel straightness and alignment, installment locations and alignment, and any other suitable quality characteristic. The plurality of scanners then generates a report to the quality check system, where the sorting system is configured to determine if the pre-cast construction panel of interest is to be passed, salvageable, or rejected for return. If the pre-cast construction panel meets the quality characteristics, the pre-cast construction panel proceeds to be transported to the general stockyard. If the pre-cast construction panel of interest is rejected, but salvageable, the pre-cast construction panel is routed to the quality maintenance station. The quality maintenance station is composed of a plurality of chambers provided with a geometry correction machine. In the preferred embodiment, the geometry correction machine takes the form of a plurality of robotic machines outfitted with the necessary geometric correction tools, such as, but not limited to cutters, rounders, routers, drills, endmills, or any other suitable geometric correction tool. In this station, the geometric correction machine repairs the defects of the pre-cast construction panel such that the pre-cast construction panel meets the quality characteristics. After repairing the pre-cast construction panel, a crane machine loads the corrected pre-cast construction panel to the repair conveyor system to be shipped to the general stockyard. In the preferred embodiment, the general stockyard takes the form of a construction storage facility outfitted with a cartesian grid crane system. The general stockyard stores QC passed plurality of pre-cast construction panels. In the general stockyard, the QC passed plurality of pre-cast construction panels are each subjected to a panel barcode comprising identification characteristics such as but not limited to date of arrival, panel manufacturer, quality test results, and location in the general stockyard.

In the preferred embodiment, the sequencing zone is the site where the QC passed and stocked plurality of pre-cast construction panels is further grouped together as building materials and packed in dedicated pallets. The dedicated pallets are set in an ordered queue such that the plurality of building materials fulfill an appropriate order suitable for the assembly process. In the preferred embodiment, the assembly zone is the site where the main assembly process of the plurality of building materials is assembled into the constructed building module. In the preferred embodiment, the assembly system comprises a twin girder base with auto adjustable guiding plate and adjustable side push-pull struts, a robotic crane, laser scanner, and hydraulic jack. In the assembly zone, the crane lifts the sequenced plurality of building materials and installed them on the base girders. The guiding plates and the push-pull struts hold the panels in their desired locations while maintaining alignment and straightness. The laser scanners further provides quality checks during the assembly process. In the preferred embodiment, the twin girder is configured to carry articles up to 100 tons and provided with hydraulic jacks to lift them fully loaded after completion of module assembly. The girders are 9 m long with expandable telescopic ends to cater for long modules up to 12 m long. A motorized angle at each end of the girder provides internal restrain at the bottom of the load bearing panels against the hydraulic push pull struts at the outer face of the panels. The angle slides along the girder top to suit the accurate location of the panels. The assembly system further comprises a black box further comprising set of hydraulically operated telescopic tubes with the proprietary grips. The hydraulic operated telescopic tubes pops out above the girders and the tubes expand in both directions (X & Y) to meet the bottom edges of the constructed building module side panels and grip them from the preset holding points. The main frame controls the extended arms according to the 3D model of the module in hand and the data collected from the scanners. The hydraulic push-pull struts are installed on the surrounding frame around the assembly station. They are located at two levels, the first is at the bottom level of the assembled module (top of the girder) and the other is at the mid-height of the assembled module. The struts have proprietary grip handles that catch the panel from predetermined points. They run by a hydraulic system controlled by the main frame that determines the amount of adjustment at each point based on the laser scanner's output. The laser scanner system comprises a set of 3D laser cameras fixed on the external surrounding frame spread to cover all corners of the assembled module over multi levels (generally three levels). A dedicated set of scanners is responsible of the internal panel surfaces and the internal partitions. The carriage is an electric trolley designed to carry loads up to 25 tons and move along a track rail network. It has a vertically sliding frame powered by a hydraulic system. The frame has a motorized rubber lined roller that slides along its top cord (across the carriage) to meet the proper position around the module's center of gravity. Some scanners are stationary, some carried by drones and others are attached to robotic arms as needed. The scanners are based on Lidar technology to provide the main frame with live data on the panels' surfaces status, verticality, alignment and assembly defects beyond preset parameters. The main frame spontaneously analyses such data and controls the movement of the struts, the black box and the supporting angles. In the preferred embodiment, a one meter wide border wall surrounds the assembly station.

The wall is a steel frame covered with protection sheets and provides the necessary support for the push-pull struts and the laser scanners.

The carriage has an electronic control panel with Wi-Fi communication system ready for 5G. Each carriage has a unique IP address used by the main frame to pair it with other carriages (sets of four carriages) to become one body and move together as one large carriage. Each module will use four carriages that act like mobile pedestals to move in the production area. After assembly, the main frame instructs four carriages to travel to the assembly station and align themselves under the lifted module at the preset points. They become the module feet till the end of production bay when the box is dispatched. In the preferred embodiment, the transit system comprises a steel platform driven by electric motors on steel wheels rolling on four track rails across the start of the production bay right after the assembly zone. The transit platform has four lines of track rails welded on its deck matching the rail set in the assembly station. The transit platform moves under the control of the main frame between three main positions: The first position is in front of the assembly station at which the platform stops to deliver the empty carriages just after assembly is over and stays there to receive the loaded carriage set (four carriages) with the assembled module on them. The second is at the start of the production line at which the platform stops and maintains its rails 100% aligned with the track rails of the production line. The third position is at the exit of the carriage return tunnel where the selected empty four carriages drive on the platform to move to first position. The main frame decides the timing, speed and positions of the platform according to the production program.

In the preferred embodiment, the finishing zone of the factory comprises one assembly zone and the plurality of finishing stations. The constructed building module moves along the production lines in which the production activities take place, and the modules grows from a grey concrete box (constructed building module) at the beginning of the line to a fully finished modular building construct. In the preferred embodiment, each of the plurality of finishing stations is divided into zones each one of them is defined for certain activity or a set of activities. The zones are like bus stops for the modules where they stay during the operation shift and move at the end of the shift to the next stop. Therefore, the activities at each stop are designed and arranged to allow for such movement without letting unfinished activities behind. The nine production zones in each production line start with the structural closure station (zone 1) in which the tolerance gaps left during assembly are closed by pumping proprietary non shrink grout after the mechanical connections are tightened and secured. Robotic arms would inject the grout supported with grout pumps. The grouting could be done from top of the module, its surrounds and from the bottom as needed. The electrical conduits and the embedded pipe network would be inspected and tested in this zone to assure there is no blockage in any of them. The rest of finishing activities resume from zone 2 onwards by setting lines, levels and startup points for the finishing items and defining the room's finish floor level. The reference levels are marked on the wall for the manual intervention when needed and visual/analogue quality check at a later stage. The reference points for tiles, door levels, window frame setup and false ceiling levels are determined and fixed in zone 2 also. Finishing activities are conducted by the robotic arms located in the corridor between the finishing zones supported with laser sensors and GPS. The coordinates of the reference points and levels are fed back to the main frame system.

Some of the robotic arms "will be devised with carriages to enter the rooms and conduct their tasks inside the modules. Plumbing works including those below the floor slabs are preassembled in the workshops together with the HVAC system whereby the activities are purely installing modularized and preassembled offline in the workshops (can also preordered in that manner).

In this station, there is another steel platform (smaller than the modules' platform) driven by electric motor on steel wheels rolling on two track rails across the end of production bay. This platform also has four lines of track rails welded on its deck matching the rail set in the production line. The platform moves under the control of the main frame between two positions: Position 1 is at the end of the production line at which the platform stops and maintains its rails 100% aligned with the track rails of the production line to allow the empty carriages (after lifting the module) to slide over it. Position 2 is at the start of the carriage return tunnel where the empty four carriages drive from the platform to the return tunnel queued for the next load. The main frame is responsible of the timing, speed and positions of the platform according to the production program.

In the preferred embodiment, the method and system for a modular construction factory may follow the following process into processing pre-cast construction panels to the finished modular building construct. Precast panels are the raw material for the structural frame. While precast supply fluency is important for the production process, panels' quality is more important because it affects the tolerances of the production activities. Precast panels are generally delivered with production defects like thickness variances, overall geometry inaccuracy, inserts location deviations and warping. Therefore, the quality of the panels has to be maintained and secured before production starts. The inventory process goes through the following steps: Once the panels are delivered, their barcode is scanned and entered to the system. To enable easy lifting and releasing by the cranes, the panels are provided with magnetic lifting clutches attached to the lifting anchors of the panels. For the first step of quality process, the panels are taken to the quality assessment station that can take 12 panels in its 12 chambers. Each chamber has a motorized laser scanner. The panel is hung by the spreader beam on top of the chamber walls. The scanner has a vertical arm provided with a set of laser projectors and runs along the panel covering its two sides. At the end of the scanning process, the scanners issue a report to the main frame to determine which panel is rejected, which one is reparable, and which is acceptable. Rejected panels are sent back to the exit point to be returned to the suppliers. Acceptable panels go to the general stockyard. Repairable panels go to the quality maintenance chamber. The repair process is done by a robotic arm (cutting and adjustment) with the help of a technician for grouting and making good activities. Based on the production program the panels are gathered in groups and packed in pallets each of them represents one module then arranged in queue ready for transfer to the assembly stations. Using the transit platform, the pallets are called according to the production program and stored in the buffer zone next to the assembly station. In the buffer zone next to the assembly station, the panels are provided with some accessories needed for assembly: Fix the saddle rings. The rings are of two types, one for permanent mechanical precast connection (made of cast iron) and one temporary for handling the panels during assembly via the grip handles attached to the assembly arms and struts. Fix the other mechanical precast connectors. Fix the swelling rubber bars at the panels' edges to play the role of "permanent packing rods" to prevent grout loss and be the base for sealant work afterwards.

In the assembly zone, the structure of the room in hand is built by assembling precast panels together to form the module. The process is conducted using an overhead crane with smart spreader beam both of them are fully controlled by the main frame. it has the following steps: Slide the supporting angles towards the edges of the base girders to meet the panels' installation locations (step 1). Install the first load bearing panel on the girder and move the angles on both faces of the panel to hold it (step 2). Stretch the push-pull struts at the external face of the panel to prop it (step 3). The stretch length of the struts is determined to maintain verticality and alignment of the panel controlled by the laser scanners fixed on the surround walls (step 4). The crane is released by the main frame according to the scanners' report (step 5). Repeat steps 1 to 5 to install the opposite load bearing wall/panel no. 2 (step 6). Deploy the black box and stretch the telescopic arms right above the girder (and below the floor slab) to meet the side panels' positions (step 7). Install the first side wall (panel No. 3) supporting it vertically on the perpendicular load bearing walls and laterally prop it using the internal arms (from the black box) and the external push-pull struts (step 8). Repeat steps 7 & 8 to install the other non-load bearing side wall (wall No. 4) (step 9). Tighten the mechanical connections between the walls (step 10). Install the floor slab supporting it on the mechanical saddle connection rings previously fixed to the panels in step II-b above (step 11). Scan the levels and alignment of the slab by the scanner then release the crane (step 12). Tighten the connections between the slabs and the walls (step 13). Fix the MEP first fix connections between the slab and the walls (step 14). Install partition walls (if any) by laying them on the floor slab and laterally hold them by connections to the walls next to them (temporary props might be needed in some cases) (step 15). Install the MEP cages (if any) (step 16). If the pods are used in the project in hand, the partition installation would be replaced with the pods' installation that is very similar to partition installation (step 17). Fix the swelling rubber rod along the top of the walls and clean the top surface of the walls and fix the levelling shims with the thickness needed (step 18). Spread the strip of grout on top of the walls inside the two swelling rubber rods to receive the slab. Meanwhile, the slab will be provided with the dowels that connect it with the walls (step 19). Install the slab and tighten the mechanical connections between the slab and the walls (step 20). Retract the push-pull struts, the girder angles and the black box arms (step 21). Lift the girder with the full load (the module) up using the built-in hydraulic jacks and order the carriages (step 22). Align the carriages under the load bearing walls. The carriages should be properly located under the module's center of gravity) at least around the grid perpendicular to the load bearing walls (step 23). Secure the module on the carriages' heads (step 24). Retract the girder down (step 25).

In the transit system, the structure of the room in hand is built by assembling precast panels together: Synchronize and pair the carriages to act as one body that takes orders wirelessly from the main frame under one address point. Move the module on the carriages to the module transvers transit platform. The platform shall be parked and properly locked in a way that the four track rails on it are 100% aligned with the rails of the assembly station. The load shall move safely to be fully carried and contained by the platform. Then, the carriages are fully locked at their positions. Move the platform towards the destination production line. Park the platform to maintain full alignment of its rails with the rails of the production line. Unlock the carriages (as one set). Move the load to enter the production line. Now the load (the module carried by the four synchronized carriages) will be moving along the production line moving from one production zone to another.

The finishing zone is divided into zones, where each zone is dedicated for a set of activities conducted by the plurality of finishing stations. The activities are planned to finish over one day shift with exception to zone 1 and 3 that need two-day shifts. Each zone would be programmed with certain activities that might vary corresponding to the project's nature. These activities include, but are not limited to grouting all walls and slabs, installation of wire support frames, tightening mechanical connections, checking and rectifying the floor trap location, closing all openings in slabs, preparing surfaces for waterproof systems, waterjet cleaning, installation of all parts related to the electrical systems (wires, tags, etc.), plumbing, bathroom fixtures, ducting, painting, ceiling installation, furnacing, flooring, glass partitions, windows, doors, or any other suitable activity.

The finished modular building construct is inspected for quality before dispatch to the site. The quality check is split into the following categories: The geometrical quality assessment conducted using mobile Lidar laser, scanners similar to the ones used in the precast elements' quality control zone. The Electrical network quality assessment that is carried out by dedicated specially programmed mini robot following the project's specific Magar test procedures. Mechanical and plumbing networks quality assessment carried out by specialized automated equipment. Aesthetic and visual quality assessment that need to be inspected by the civil and architectural inspection team to clear the module for dispatch. Before dispatch and after quality assessment clearance, the modular building construct is shrink-wrapped by the packaging machine. This activity can either be conducted before, or after, lifting the module from the carriages at the end of a specified zone or after loading the modular building construct on the truck for dispatch.

Elements and modules' handling is automatically carried out whereby the cranes, the spreader beams, platforms and spreader frames are supposed to recognize the elements and finishing components albeit tiles, fixtures, joinery, etc. as well as the modules at the end of production lines. Therefore, the inventory is built depending on dynamic barcode system through which every activity and update is registered in the barcode since the precast element arrives to the inventory gate. At the beginning of inventory process and once the precast element lands in the factory, the element tag together with manufacturing information, date of production and date of arrival are used to generate the first version of barcode and print it on the panel in a predefined location referenced to one of the panel's corners or edges. Such precision in the preset barcode print helps further handling process smooth and eliminates time of scanning to search and locate the barcode. When the panel moves from the quality assessment to the inventory store, the barcode is updated with the quality assessment status through which the quality report is reachable either digitally by the machines or physically by printing it on hard or soft media. The panel then is allocated in the inventory and the database in the main frame is updated with the precise location of the unique barcode of the concerned panel. Once the cranes are instructed afterwards to move the panel from a place to another in the inventory area or to the assembly station, database is updated with the new coordinates of its corresponding barcode.

At the end of assembly process, a new barcode is generated for the produced module that registers the date and time of assembly and information on all of the components used in it. The new barcode will keep growing down the production line with more data will be added to it reflecting the finishing items used, date & time of installation, waterproofing material and application status, installed equipment and devices, etc. while at the end of the production line, the barcode would become QR code for larger data.

Each production zone has one or more of specific equipment and tools as per the following list: The plurality of transit carriages is a plurality of heavy-duty carriages. The plurality of heavy-duty carriages can take up to 25-ton weight, fully electric, IP addressable. The carriages can be synchronized to work in groups of two, four or six as one integrated trolley. An electronic control board provided with Arduino and Raspberry pi4 controllers will control the carriage, communicate with other carriages and connect with the main frame (software) of the particular production bay. The plurality of scanners is a machine mounted on a carriage that travels on rails along the quality scan compartment provided with a motorized vertical mast that covers the panel surround while moving. The mast carries a set of Lidar scanners capable to read objects up to 1 mm accuracy. The transit platform takes the form of a heavy duty flat top carriage with "A" frame to support precast panels. The platform can take loads up to 50 tons on which the set of panels related to one module are grouped together. The platform is provided with electronic board similar to that of the module carriage.

The plurality of transit carriages is a heavy duty flat top carriage with a set of rails to match the rails of the carriage movement in the production lines. The platform can take loads up to 100 tons on which the module loaded on the four carriages are taken from the assembly station to enter the production lines. The platform is provided with electronic board similar to that of the module carriage with all the necessary geometry and loading sensors.

The plurality of carriages is a lighter version of the transit platform with a set of rails to match the rails of the carriage movement in the production lines. The platform can take loads up to 10 tons on which two carriages are taken from end of the production lines to enter the tunnels between the production lines back to the beginning of the process at the assembly station. The platform is provided with electronic board similar to the module transit platforms.

The assembly station assembles the modules with the help of the overhead crane. It is provided with Lidar laser scanners of high definition to read the panel surfaces, module geometry, squareness, alignment and verticality. The panels are seated on the main girder and balanced by the sliding steel bracket toes and the hydraulic props built in the station surround wall. The smart grip arms are special motorized arms fixed on the hydraulic props to hold the panels by which the prop restrains the lateral movement of the subject panel. The smart spreader 100-ton frame is adjustable to accommodate the center of gravity of the module within the lifting center. This adjustment takes place as instructed by the main frame according to the BIM model of the project. The smart spreader 20-ton beam is also adjustable to accommodate the center of gravity of the module within the lifting center. This adjustment takes place as instructed by the main frame according to the BIM model of the project. The beam has special lifting devises to handle the panels as replacement to the conventional lifting hooks. The magnetic smart lifting clutch is electric actuated remote-controlled device specially designed to interface between the conventional lifting hooks and the smart spreader beams. The saddle connector is a two-part mechanical connection that can provide three directional movement restrains between the connected panels. It absorbs location tolerance up to 20 mm in all direction and allows fine tuning adjustment after installation without losing connection integrity. Robotic arms are utilized for precast panels repair, grouting, painting, tiling, windows fixing, doors fixing and MEP cage handling. The robotic arms, however, will be customized to suit the needed application such as moving into the rooms and working in small zones with height adjustment.

Although the invention has been explained in relation to its preferred embodiment, it is to be understood that many other possible modifications and variations can be made without departing from the spirit and scope of the invention as hereinafter claimed.

The following is claimed:

1. A method for a modular construction factory, the method comprising the steps of:
    providing a plurality of pre-cast construction panels, a quality control zone, a transportation system, a general stockyard, a sequencing zone, an assembly zone, an assembly system, and a transit system;
    transporting the plurality of pre-cast construction panels from a supply source to the quality control zone through a panel conveyor system;
    inspecting each of the plurality of pre-cast construction panels through the quality control zone, wherein the quality control zone is configured to process the plurality of pre-cast construction panels into a quality control (QC) passed plurality of pre-cast construction panels;
    transporting the QC passed plurality of pre-cast construction panels from the quality control zone to the general stockyard through the transportation system, wherein the transportation system is an overhead crane;
    sequencing the QC passed plurality of pre-cast construction panels into a plurality of building materials in the sequencing zone, wherein the plurality of building materials is a plurality of precast elements stored in a plurality of pallets;
    transporting the plurality of pallets from the sequencing zone to the assembly zone using the transportation system;
    assembling the plurality of precast elements received from the sequencing zone using the assembly system to form a constructed building module;
    transporting the constructed building module from the assembly zone using the transit system; and
    finishing the constructed building module to form a modular building construct, wherein the modular building construct is a premanufactured prefinished volumetric construction unit (PPVC).

2. A method for a modular construction factory as claimed in claim 1, the method comprising the steps of:
    providing a quality check system, wherein the quality check system comprises a plurality of scanners wherein the plurality of scanners is configured to check panel geometry of each of the plurality of pre-cast construction panels;
    scanning the plurality of pre-cast construction panels in to check panel geometry using the plurality of scanners; and sorting the plurality of pre-cast construction panels, wherein the plurality of pre-cast construction panels are sorted into the QC passed plurality of pre-cast construction panels.

3. A method for a modular construction factory as claimed in claim 2, the method comprising the steps of:
providing a quality maintenance station comprising a repair conveyor system and a geometry correction machine;
sorting the plurality of pre-cast construction panels, wherein a plurality of redeemable rejection panels is sorted from the plurality of pre-cast construction panels;
transporting the plurality of redeemable rejection panels to the geometry correction machine through the repair conveyor system; and
repairing the plurality of redeemable rejection panels using the geometry correction machine into the QC passed plurality of pre-cast construction panels.

4. A method for a modular construction factory as claimed in claim 2, the method comprising the steps of:
providing a reject conveyor system;
sorting the plurality of pre-cast construction panels, wherein a plurality of reject return panels are sorted from the plurality of pre-cast construction panels; and
transporting the plurality of reject return panels through the reject conveyor system.

5. A method for a modular construction factory as claimed in claim 1, the method comprising the steps of:
providing a plurality of connectors;
transporting the plurality of building materials from the sequencing zone;
installing the plurality of connectors along the plurality of building materials to form a plurality of pre-assembled panels;
transporting the plurality of pre-assembled panels from the sequencing zone to the assembly zone using the transportation system;
assembling the plurality of pre-assembled panels received from the sequencing zone using the assembly system to form a constructed building module;
transporting the constructed building module from the assembly zone using the transit system; and
finishing the constructed building module to form a modular building construct, wherein the modular building construct is the premanufactured prefinished volumetric construction unit (PPVC).

6. A method for a modular construction factory as claimed in claim 1, the method comprising the steps of:
providing the assembly system comprising an assembly frame, a bottom assembly frame, a plurality of carriages, a plurality of hydraulic jacks, and a crane machine;
receiving the plurality of building materials from the transportation system, wherein the plurality of building materials comprises a first load bearing wall, a second load bearing wall, a first side wall, a second side wall, a precast floor slab, a plurality of partitions, a mechanical, electrical, plumbing (MEP) cage, and a roof slab;
installing the first load bearing wall along the assembly frame using the crane machine;
installing the second load bearing wall along the assembly frame and the bottom assembly frame using the crane machine;
installing the first side wall along the assembly frame using the crane machine;
installing the second side wall along the assembly frame using the crane machine;
installing the precast floor slab along the assembly frame using crane machine;
installing the plurality of partitions along the assembly frame using the crane machine;
installing the MEP cage along the assembly frame using the crane machine;
installing the roof slab along the assembly frame using the crane machine to form a constructed building module;
lifting the assembly frame up using the plurality of hydraulic jacks under the frame;
aligning the carriages under the lifted constructed building module;
positioning the constructed building module along the plurality of carriages; and
retracting the bottom assembly frame from the constructed building module using the plurality of carriages.

7. A method for a modular construction factory as claimed in claim 1, the method comprising the steps of:
providing the transit system comprising a plurality of transit carriages and a transit pathway, wherein the transit pathway traverses from the assembly zone;
synchronizing the plurality of transit carriages to form a transit platform using the transit pathway;
positioning the transit platform along the assembly system, wherein the transit platform is configured to lift and hold the constructed building module along the plurality of transit carriages; and
transporting the constructed building module from the assembly zone using the transit pathway.

8. A method for a modular construction factory as claimed in claim 7, the method comprising the step of:
transporting the constructed building module along the transit pathway, the constructed building module is finished to form a modular building construct, wherein the modular building construct is a PPVC unit (Premanufactured Prefinished Volumetric Construction unit).

9. A method for a modular construction factory as claimed in claim 7, the method comprising the steps of:
providing a shipping station, wherein the shipping station comprises a shipment carriage, and a shipment vehicle;
transporting the modular building construct to the shipping station;
packaging the modular building construct to form a packaged modular building construct; and
transporting the packaged modular building construct from the shipping station to the shipment vehicle.

10. A method for a modular construction factory as claimed in claim 1, the method comprising the steps of:
providing a quality assurance system, wherein the quality assurance system comprises a plurality of quality check scanners;
scanning the modular building construct to check building quality using the plurality of quality check scanners; and
inspecting the modular building construct to check building quality.

* * * * *